(12) United States Patent
Tsai

(10) Patent No.: US 9,577,712 B2
(45) Date of Patent: Feb. 21, 2017

(54) NON-DISPLAY SIGNAL ENCODING METHOD AND MATRIX SUBSTRATE

(71) Applicant: Hsiung-Kuang Tsai, Taipei (TW)

(72) Inventor: Hsiung-Kuang Tsai, Taipei (TW)

(*) Notice: Subject to any disclaimer, the term of this patent is extended or adjusted under 35 U.S.C. 154(b) by 0 days.

(21) Appl. No.: 14/403,868

(22) PCT Filed: Apr. 19, 2013

(86) PCT No.: PCT/CN2013/074393
§ 371 (c)(1),
(2) Date: Nov. 25, 2014

(87) PCT Pub. No.: WO2013/174186
PCT Pub. Date: Nov. 28, 2013

(65) Prior Publication Data
US 2015/0124903 A1    May 7, 2015

(30) Foreign Application Priority Data

May 25, 2012  (WO) ................ PCT/CN2012/076056
Oct. 29, 2012  (WO) ................ PCT/CN2012/083679

(51) Int. Cl.
*H04B 5/00* (2006.01)
*G09G 3/20* (2006.01)
*H04W 4/00* (2009.01)

(52) U.S. Cl.
CPC ......... *H04B 5/0031* (2013.01); *G09G 3/2096* (2013.01); *G09G 2370/16* (2013.01); *H04W 4/008* (2013.01)

(58) Field of Classification Search
CPC .. G06F 3/044; G06F 3/14; G06K 5/00; G06T 1/20; G09G 3/2096; G09G 3/30; G09G 5/00; G09G 5/18; H04B 5/00; H04B 5/0031; H04W 4/00
USPC ............. 340/539.13; 345/1.3, 76, 204, 520; 375/219, 295, 316; 455/41.1, 41.2
See application file for complete search history.

(56) References Cited

U.S. PATENT DOCUMENTS 4,506,252 A    3/1985  Jacoby et al.
4,841,290 A *  6/1989  Nakano ................ G06F 3/0412
                                                      345/179
(Continued)

FOREIGN PATENT DOCUMENTS

CN    101263445 A    9/2008
CN    101452521 A    6/2009
(Continued)

*Primary Examiner* — Shawkat M Ali
(74) *Attorney, Agent, or Firm* — Muncy, Geissler, Olds & Lowe, P.C.

(57) ABSTRACT

A non-display signal encoding method cooperates with a matrix substrate including a plurality of electrodes. The electrodes cross each other and transmit a plurality of display signals and a plurality of non-display signals. The non-display signal encoding method comprises steps of: transmitting the non-display signals by at least one of the electrodes during a first time; and receiving by coupling at least a part of the non-display signals by at least an external object, wherein the non-display signals have at least three states, i.e. a first state, a second state, a third state or their any combination, and the first, second and third states are different from one another. A matrix substrate is also disclosed.

18 Claims, 12 Drawing Sheets

(56) References Cited

U.S. PATENT DOCUMENTS

| | | | | |
|---|---|---|---|---|
| 5,914,701 | A * | 6/1999 | Gersheneld | G06F 3/017 340/13.31 |
| 6,040,814 | A * | 3/2000 | Murakami | G09G 3/3648 345/209 |
| 7,280,851 | B2 * | 10/2007 | Oba | G06F 3/04817 455/41.1 |
| 8,400,280 | B2 * | 3/2013 | Han | G06K 7/10346 235/375 |
| 2004/0189625 | A1 | 9/2004 | Sato | |
| 2009/0254438 | A1 | 10/2009 | Johnson, Jr. et al. | |
| 2010/0044669 | A1 * | 2/2010 | Happ et al. | 257/3 |
| 2010/0079273 | A1 * | 4/2010 | Tsubota et al. | 340/539.1 |
| 2011/0059692 | A1 * | 3/2011 | Hyoung et al. | 455/41.1 |
| 2011/0267295 | A1 * | 11/2011 | Noguchi | G06F 3/0416 345/173 |
| 2011/0304583 | A1 | 12/2011 | Kruglick | |

FOREIGN PATENT DOCUMENTS

| | | |
|---|---|---|
| CN | 101576667 A | 11/2009 |
| CN | 102013901 A | 4/2011 |
| CN | 102013901 A | 4/2011 |
| JP | 6-318136 | 11/1994 |
| JP | H07-020421 A | 1/1995 |
| WO | WO 2009/061043 A1 | 5/2009 |
| WO | WO 2013/037103 A1 | 3/2013 |

\* cited by examiner

| electrode | state | T1 |
|---|---|---|
| G1 | | S1 or S3 |
| G2 | | S2 |

| electrode \ time state | T1 |
|---|---|
| G3 | S2 |
| G1 | S1 or S3 |
| G2 | S2 |

| electrode \ state | time T1 |
|---|---|
| G1 | S1 or S3 |
| G2 | S2 |
| G3 | S1 or S2 or S3 |

| electrode \ state | time | T1 | T2 |
|---|---|---|---|
| G1 | | S1 or S3 | S2 |
| G2 | | S2 | S1 or S2 or S3 |

| electrode \ state | time T1 | T2 |
|---|---|---|
| G1 | S1 or S3 | S2 |
| G2 | S2 | S1 or S2 or S3 |
| G3 | S1 or S2 or S3 | S2 |

| electrode \ state \ time | T1 | T2 | T3 |
|---|---|---|---|
| G1 | S1 or S3 | S2 | S1 or S2 or S3 |
| G2 | S2 | S1 or S2 or S3 | S2 |
| G3 | S1 or S2 or S3 | S2 | S1 or S2 or S3 |

| second electrode \ first electrode state | 0V | 5V |
|---|---|---|
| -12.5V | S1 | S3 |
| -10V | S2 | S4 |

FIG. 11

NON-DISPLAY SIGNAL ENCODING METHOD AND MATRIX SUBSTRATE

BACKGROUND OF THE INVENTION

Field of Invention

The invention relates to a nondisplay signal encoding method and a matrix substrate.

Related Art

In recent years, for expanding the application of the consumer electronics, people start to introduce the near field communication (or short range wireless communication) technology in the electronic products. Near field communication technology can allow the transmission, such as command, music, picture, business card, data or file from an electronic apparatus to another electronic apparatus without establishing a physical wire connection, so that the electronic apparatus is more favorable for the data transmission and can be applied to mote different areas. For example, the occasions require IC cards, such as access control, tickets, credit cards, or receive advertising information, such as receiving the coupon ticket from the screen in the market through the Bluetooth technology.

For applying the near field communication to the electronic product, the conventional way is to adopt a special signal emitting device. Also, a proper encoding method is required to maximize the efficiency of the signal emitting device. Therefore, it is an important subject to provide an innovative structure of the signal emitting device and an encoding method in the near field communication technology.

SUMMARY OF THE INVENTION

An objective of the invention is to provide a matrix substrate which integrates the display function and the signal transmitting function of as near field transmitter. By the integration with the display panel, the signal transmitting source can be embedded in the display module, and the non-display data and the display data can be integrated and sent to the display module. The display data will be convened into a display image and the non-display data will be transmitted by the matrix substrate. Due to the integration with the display panel, this invention can achieve lower cost in comparison with other methods by just integrating the non-display signals and the display signals. Accordingly, a non-display signal encoding method is further disclosed in this invention. Thereby, the matrix substrate of this invention can fully use its spatial dimension and time for transmission and the mutual interference between the non-display signals during the transmission process can be minimized so as to reduce the receiving error at the receiving side. Besides, different data can be transmitted at the same time by using different positions of the matrix substrate, which is equivalent to a near field transmitting device with multi-channel, so that the advantages such as high throughput, reliability and security are provided.

To achieve the above objective, a non-display signal encoding method according to this invention cooperates with a matrix substrate including a plurality of electrodes. The electrodes cross each other and transmit a plurality of display signals and a plurality of non-display signals. The non-display signal encoding method comprises steps of transmitting the non-display signals by at least one of the electrodes during a first time; and at least an eternal object receives by coupling at least a part of the non-display signals, wherein the non-display signals have at least three states, i.e. a first state, a second state, a third state or their any combination, and the first, second and third states are different from one another.

To achieve the above objective, a matrix substrate according to this invention comprises a plurality of electrodes crossing each other and transmitting a plurality of display signals and a plurality of non-display signals. At least one of the electrodes transmits the non-display signals during a first time, at least an external object couples to receive at least a part of the non-display signals, the non-display signals have a first state, a second state, a third state or their any combination, and the first state, second state and third state are different from one another.

In one embodiment, the matrix substrate is an active matrix substrate or a passive matrix substrate.

In one embodiment, the first, second and third states have different amplitudes, or levels, or phases, or frequencies, or then any combination.

In one embodiment, electrodes of the matrix substrate include a plurality of first electrodes arranged along a first direction and a plurality of second electrodes arranged along a second direction, and at least one of the first electrodes or second electrodes transmits the non-display signal.

In one embodiment, the first electrodes or second electrodes include a first electrode group and a second electrode group, and each of the electrode groups includes at least an electrode.

In one embodiment, during the first time, the first electrode group transmits the non-display signal of the first state or third state, and the second electrode group transmits the non-display signals of the second state.

In one embodiment, the first electrodes or second electrodes further include a third electrode group, the first electrode group spatially separates the second electrode group from the third electrode group. The non-display signal encoding method further includes a step of: during the first time, the first electrode group transmits the non-display signals of the first state or third state and the second and third electrode groups transmit the non-display signals of the second state.

In one embodiment, the first electrodes or second electrodes further include a third electrode group, the second electrode group spatially separates the first electrode group from the third electrode group. The non-display signal encoding method further includes a step of: during a first time, transmitting the non-display signals of the first state or third state by the first electrode group, transmitting the non-display signals of the second state by the second electrode group, and transmitting the non-display signals of the first state, second state or third state by the third electrode group.

In one embodiment, the electrode transmitting the non-display signals transmits the non-display signals of the second state during at least one of the first time and second time.

In one embodiment, during the first time, the first electrode group transmits the non-display signals of the first state or third state and the second electrode group transmits the non-display signals of the second state. The non-display signal encoding method further comprises a step of during a second time, transmitting the non-display signals of the second state by the first electrode group.

In one embodiment, the first electrodes or second electrodes further include a third electrode group, and the second electrode group spatially separates the first electrode group from the third electrode group. The non-display signal encoding method further comprises steps of during a first time, transmitting the non-display signals of the same state as the above embodiment by the first and second electrode groups and transmitting the non-display signals of the first state, second state or third state by the third electrode group; and during the second time, transmitting the non-display signals of the same state as the above embodiment by the first electrode group and transmitting the non-display signals of the second state by the third electrode group.

In one embodiment, following the above embodiment, during the second time, the second electrode group transmits the non-display signals of the first state, second state or third state. The non-display signal encoding method further comprises a step of: during a third time, transmitting the non-display signals of the first state, second state or third state by the first electrode group, transmitting the non-display signals of the second state by the second electrode group, and transmitting the non-display signals of the first state, second state or third state by the third electrode group.

In one embodiment, the first electrode group and the second electrode group are directly adjacent to each other.

In one embodiment, the first time and the second time are consecutive.

In one embodiment, the matrix substrate corresponds to a display module and the encoding method further comprises a step of displaying at least a registration pattern by the display module, wherein the external object receives the non-display signals by matching to the position of the registration pattern.

As mentioned above, in the non-display signal encoding method and the matrix substrate of the invention, the encoding of the non-display signals is implemented in the manner of a system with at least three states, a ternary system. The ternary system represents the non-display signals have three different states. One of the states can be used to act as the signal for separation. By applying the separation in spatial or time domain, the mutual interference between the non-display signals transmitted by different electrodes at the same time can be reduced, or the mutual interference between the non-display signals transmitted by the same electrode at different times can be reduced. Therefore, the reliability and recognition of the data transmission can be enhanced.

This invention provides a near field data transmission structure embedded in the display module and can directly use the display module to transmit data without additional transmitter. Besides, in comparison with the conventional transmitter, this innovative structure has a distinguishing feature of multi-channel transmission which means a plurality of independent transmission channels can be generated on different spatial positions at the same time to transmit data.

In addition to the hardware structure, an encoding method cooperating with this hardware structure is also disclosed in this invention to construct independent and separate channels suitable for the usage in short distance. Therefore, not only the data throughput can be largely increased, but also the reliability and security of the signal transmission can be enhanced by multiple channels.

BRIEF DESCRIPTION OF THE DRAWINGS

The invention will become more fully understood from the detailed description and accompanying drawings, which are given for illustration only, and thus are not limitative of the present invention, and wherein:

FIG. 11 is a table of the transmission state of the electrodes of the non-display signal encoding method of an embodiment of the invention.

DETAILED DESCRIPTION OF THE INVENTION

The present invention will be apparent from the following detailed description, which proceeds with reference to the accompanying drawings, wherein the same references relate to the same elements.

Figure 1:
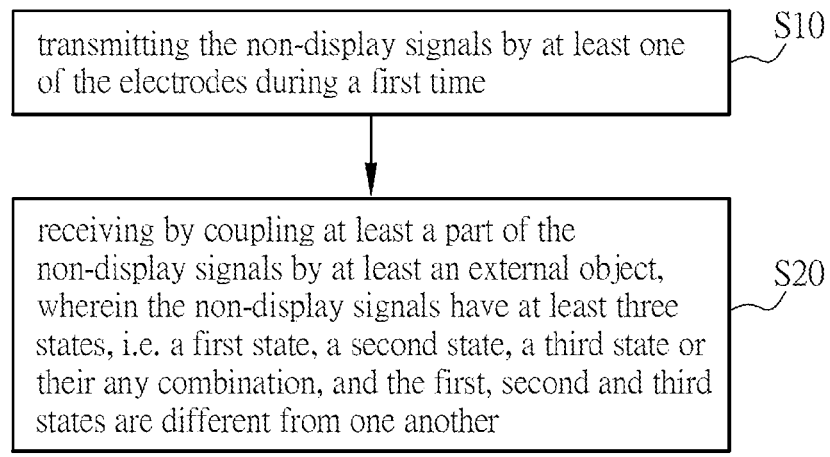
FIG. 1 is a schematic flowchart of a non-display signal encoding method of an embodiment of the invention.
Figure 2A:
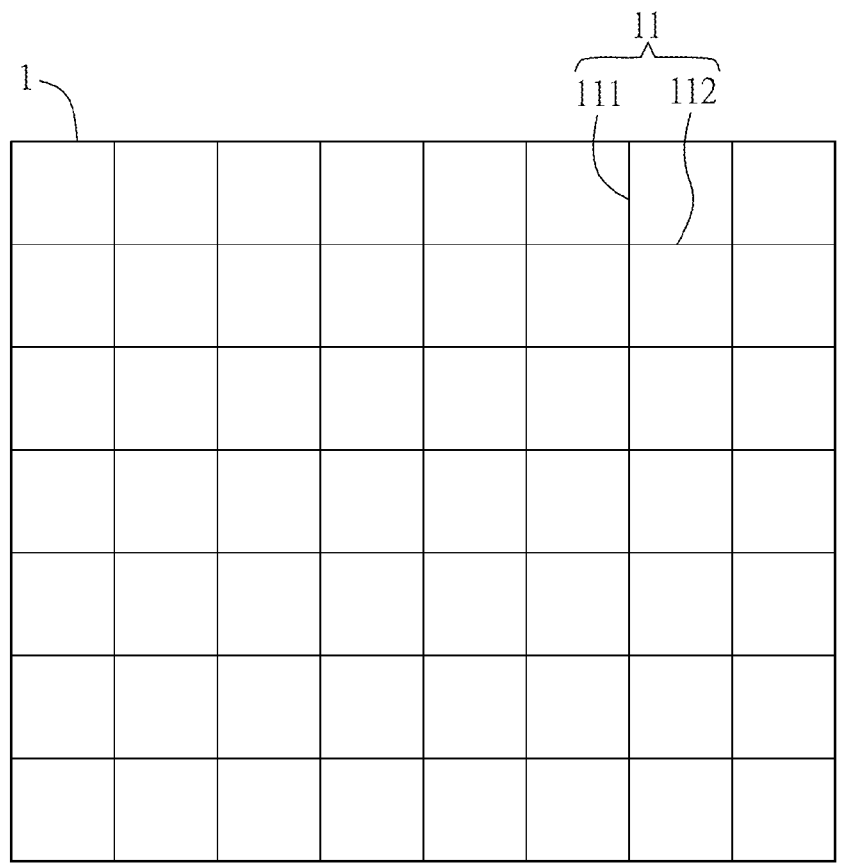
FIG. 2A is a schematic diagram of a matrix substrate of an embodiment of the invention.
Figure 2B:
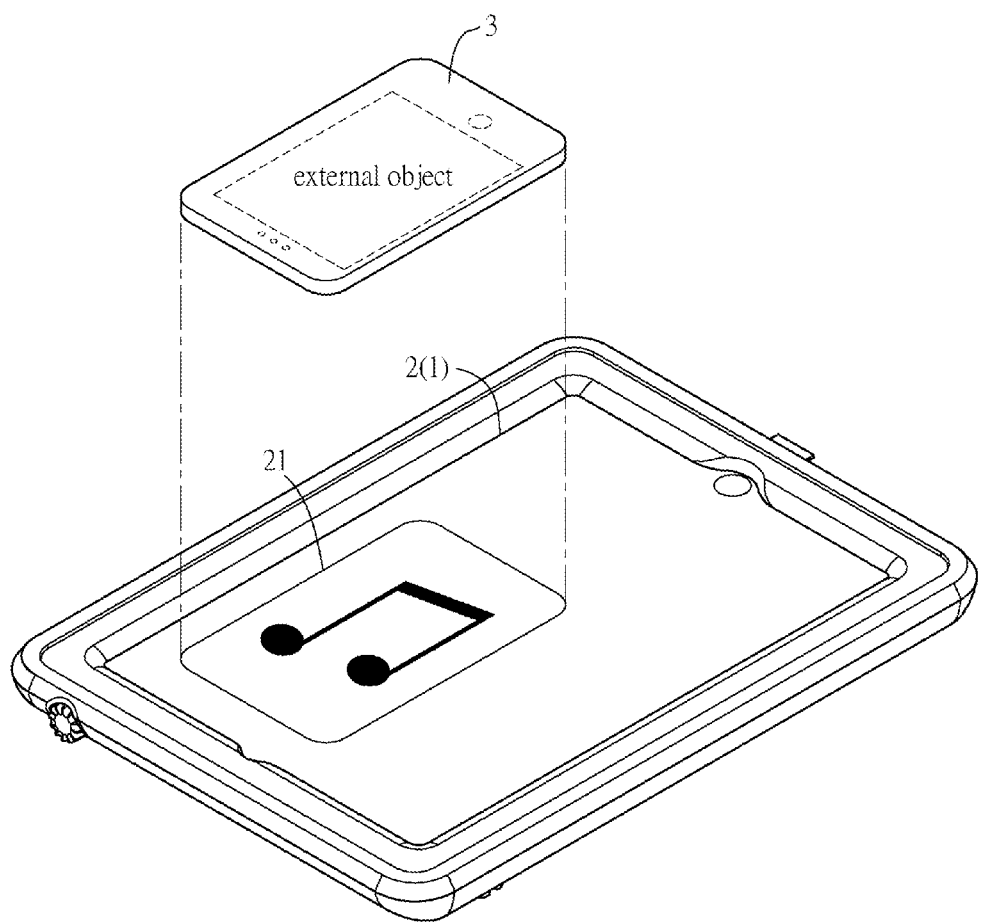
FIG. 2B is a schematic diagram of a display module including the matrix substrate of an embodiment of the invention.

FIG. 1 is a schematic flowchart of a non-display signal encoding method of an embodiment of the invention, FIG. 2A is a schematic diagram of a matrix substrate of an embodiment of the invention, and FIG. 2B is a schematic diagram of a display module including the matrix substrate of an embodiment of the invention. As shown in FIG. 2A, the non-display signal encoding method of this embodiment can cooperate with a matrix substrate 1. The matrix substrate 1 can be an active matrix substrate or a passive matrix substrate, and can be applied to a smart phone, a tablet computer, an e-paper, an LED display, an OLED display, a plasma display, or can be a circuit substrate of a light emitting device. The matrix substrate 1 includes a plurality of electrodes 11, which include a plurality of first electrodes 111 arranged along a first direction and a plurality of second electrodes 112 arranged along a second direction. The first electrodes 111 are disposed substantially in parallel and the second electrodes 112 are also disposed substantially in parallel. The first electrodes 111 and the second electrodes 112 cross each other with any included angle. Herein for example, the first electrode 111 and the second electrode 112 are disposed substantially perpendicular to each other.

As shown in FIG. 2B, the matrix substrate 1 can be a TFT substrate of an LCD panel. The matrix substrate 1 acts as one of the components of the display module 2 and is disposed in the display module 2. In other words, the matrix substrate 1 is a part of the display panel of the display module 2 for the display purpose, and the display module 2 can display images by the matrix substrate 1. To be noted, we concentrate on the matrix substrate 1 and other components that the display module 2 can include, such as polarizer, circuit board or housing, which are not shown and illustrated here.

Herein, the first electrode 111 stands for the data electrodes and the second electrode 112 is the scan electrodes, and they can be electrically connected to each other by electronic elements such as transistor or capacitor (not shown). The electrodes 11 transmit the display signals so that the display panel can display images. In other words, the display signal is transmitted for displaying images, for example, the display signals including the data signals having gray-level data and the scan signals for turning on the transistors. Moreover, in this embodiment, the electrodes 11 of the matrix substrate 1 also transmit a plurality of non-display signals. At least one of the first electrodes 111 or the second electrodes 112 can transmit the non-display signal (the first electrodes 111 and second electrodes 112 may both transmit the non-display signals). As for how the display signal and non-display signal cooperate with each other, it has been disclosed in the document PCT/CN2011/079576, wherein the encoded signal emitted by the matrix substrate corresponds to the non-display signal of this invention, and therefore the related descriptions are omitted here for conciseness.

As shown in FIG. 2B, when an external object 3 is coupled with the matrix substrate 1, the electrode 11 can transmit the non-display signal thus transmit (couple) the non-display signal from matrix substrate 1 to the external object 3 (such as a smart phone, a tablet computer or other electronic devices including at least a receiving electrode). Or, the non-display signal can be transmitted to an electronic, device including a receiving side through the external object (such as the human body). Herein, the external object 3 is, for example, a mobile phone including a display panel.

To be noted, the display module 2 can display at least a registration pattern 21. For the transmission of the non-display signal, the display module 2 displays the registration pattern 21 to show the position and use at least one of the electrodes corresponding to the position of the registration pattern 21 to transmit the non-display signals. The external object 3 can receive the non-display signal according to the registration information provided by the registration pattern 21 (for example, the whole device or display screen is disposed opposite to the registration pattern 21). During this matching process, if the receiving electrode of the receiving side is disposed in a display panel, the display surface of the external object 3 will be disposed to face the display module 2.

In the above, a single registration pattern 21 is given as an example. When the display module 2 displays a plurality of registration patterns, the registration patterns can provide the same function for coupling with different external objects 3 or provide different functions for coupling with the external object 3 so that the user can select the functions. In other words, the electrodes corresponding to different registration patterns provide the same non-display signal for different external objects, or the electrodes corresponding to different registration patterns provide different non-display signals for the external objects 3, or the combination of the above two cases are not limited in this patent. The application of the former case can be, for example, the same music is transmitted to different cell phones through the electrodes corresponding to different registration patterns. For the application of the latter case, two of the electronic books displayed on the screen are selected and transmitted to two cell phones, respectively, through the electrodes corresponding to the different registration patterns. Moreover, the registration pattern 21 not only can use lines, figures or characters to mark the region for transmitting the non-display signal, but also can contain information to mark the function of the non-display signal so that the external object 3 can select a proper registration pattern to implement the signal coupling. For example, in the case of transmitting music, the registration pattern 21 can be a musical notation. However, this invention is not limited to this scenario in practical application.

The non-display signal encoding method includes the steps S10 and S20. In the step S10, during the first time, at least one of the electrodes 11 transmits the non-display signal. The non-display signal has at least a first state, a second state, and a third state or their any combination, and the first, second and third states are different from one another. In other words, the non-display signal is a ternary system including at least three states, and herein the ternary system is given as an example. The so-called ternary system means signals of three different states can be identified according to the signal characteristics of the transmitting side or receiving side. These states can be formed by inputting different signals to the same electrode or by combining or summing the signals of different electrodes. Besides, the non-display signal can be of digital or analog form, which is not limited.

Herein, the non-display signal can be directly added on the display signal or transmitted between the display signals. By taking the TFT substrate of an LCD panel as the matrix substrate 1 for an example, when the data electrodes are used to alternately transmit the display signal and the non-display signal, the non-display signal can be transmitted after the scanning of the scan electrodes is finished and before the scanning of the next image is started (i.e. the blanking time between the frames) or after the scanning of a scan electrode is finished and before the scanning of the next scan electrode is started, or the non-display signal is first transmitted and then the pixel data signal is transmitted during the scanning time of each scan electrode, or any combination of the above cases. When the non-display signal is transmitted by the scan electrode, the transmission of the non-display signal can be implemented with the voltage lower than the turn-on voltage of the transistor during the time that the scan electrode doesn't scan. Otherwise, the non-display signal also can be transmitted by both of the data electrodes and the scan electrodes. The non-display signal can be the data signal carrying data, and the carried content thereof can be a document, picture file or video file for example. To be noted, the data signal mentioned above is different from the pixel data signal of the display signal. For example, in the application of an access control unit, by making the electronic device having the matrix substrate 1 approach the access control unit, the access control unit can receive the open-door or lock-door information transmitted by the matrix substrate 1 and therefore the access can be granted or rejected. When the matrix substrate 1 is in a public display, the user can make a mobile phone or another electronic device having the receiving electrode approach the matrix substrate 1 to download information, such as advertisement information, coupon information or geographical information.

In the step S20, at least one external object can receive by coupling at least a part of the non-display signals. In other words, the non-display signals an be transmitted from the matrix substrate 1 to the external object (a smart phone, a tablet computer, etc.) through the coupling of the external object, or the non-display signals can be transmitted to a receiving side through the external object (such as a human body or another conductor).

The first, second and third states of the non-display signals can be represented signals with different amplitudes, phases frequencies or their any combination. For example, the first, second and third states of the non-display signals can be represented by a sine wave with different phases. Below, as an example for illustration, the non-display signals of first, second, and third state are represented by signals with different amplitudes but the invention is not limited thereto.

To be noted, the first, second and third states can be defined as the state of the non-display signal on the transmitting side or receiving side. As for the former case (transmitting side), the first, second and third states can correspond to the three kinds of non-display signals transmitted by the electrode 11 to have different amplitudes, phases, frequencies or their any combination. As for the latter case (receiving side), the first, second and third states, for example three different amplitudes, can correspond to three kinds of the sum of the signals received by the receiving side of the external object during the transmission period.

Additionally, at least one state in the multiple-state system (such as ternary system or more) can be used to separate other states. By taking the ternary system as an example, one of the states, i.e. first state, second state and third state, of the non-display signals can be used to separate the other two non-display signals. Herein for example, the non-display signal of the second state is used as the separating signal to separate the non-display signal of the first state and the non-display signal of the third state. The first state and the third state can be used to represent the data of "0" and "1", respectively. The separating signal means the non-display signal of this state is not for carrying the data information but spatially or temporally separating the other two non-display signals carrying data information, and therefore the recognition level of the receiving side can be enhanced.

In this invention, the electrodes of the display panel are used for transmitting signals. These electrodes have an extremely large quantity (as to the resolution of 800×600 of SVGA, there are 2400 and 600 electrodes along two directions respectively) and are closely spaced (depending on the panel size and resolution, in general, the interval of the electrodes is less than 300 μm). In practice, for example, the application of data transmission in near field communication, it is not feasible if aligning to as specific electrode in this range is required for implementing the data transmission. Therefore, spatially, when two electrodes are used to transmit the encoded non-display signals (first state and third state), the electrode between the two electrodes can transmit a non-display signal as the separating signal (second state) to enhance the recognition of the receiving side for the encoded signals. Temporally, when an electrode transmits the non-display signals containing the encoded signals at different times, the separating signal can be added between the two transmission times to separate every transmission data. That is, the receiving side can recognize every transmitted encoded signal without an additional synchronizing signal.

Figures 3A, 3B:
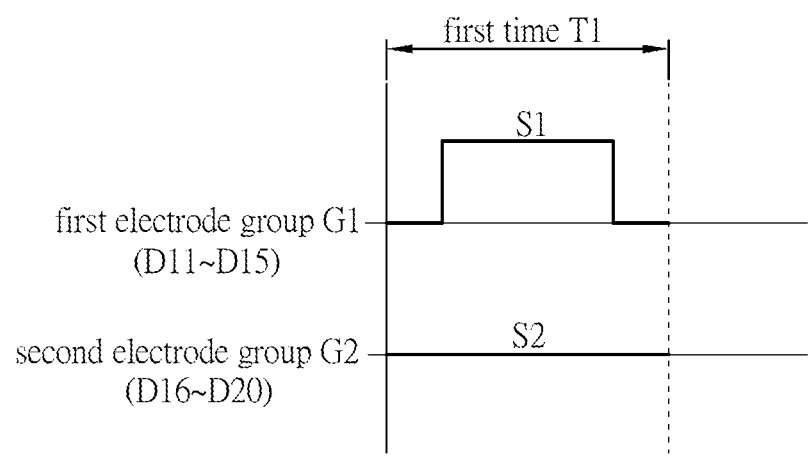
FIG. 3A is a table of the transmission state of the electrodes according to the non-display signal encoding method of an embodiment of the invention.
FIG. 3B is a schematic diagram showing the encoded non-display signal corresponding to FIG. 3A.

FIG. 3A is a table of the transmission state of the electrodes according to the non-display signal encoding method of an embodiment of the invention, and FIG. 3B is a schematic diagram showing the encoded non-display signal corresponding to FIG. 3A. Herein, the example is given by that the three states are recognized on the basis of the sum of the signals received by the receiving side of the external object. In this embodiment, also referring to FIG. 2A, the first electrodes 111 or the second electrodes 112 of the matrix substrate 1 include a first electrode group G1 and a second electrode group G2, and each electrode group includes at least an electrode. That is, the first electrode group G1 and the second electrode group G2 are substantially parallel to each other and are a part of the first electrodes 111 or the second electrodes 112. Herein for example, the first electrodes 111 are the data electrodes of the TFT substrate and include the first electrode group G1 and the second electrode group G2, and each of the first electrode group G1 and second electrode group G2 includes 5 electrodes. Moreover, the first electrode group G1 and the second electrode group G2 can be directly adjacent to each other or not adjacent to each other. In the latter case, the first electrode group G1 and the second electrode group G2 can be separated by a plurality of electrodes. Herein for example, the first electrode group G1 and the second electrode group G2 are adjacent to each other.

As shown in FIG. 3A, during the first time T1, the first electrode group G1 transmits the non-display signal of the first state S1 or third state S3 while the second electrode group G2 transmits the non-display signal of the second state S2.

In this embodiment, the first electrode group G1 can transmit the non-display signal acting as the encoded signal (i.e. the non-display signal of the first state S1 or third state S3), and the second electrode group G2 can transmit the non-display signal acting as the separating signal (the non-display signal of the second state S2). Of course, the first electrode group G1 and the second electrode group G2 also can both transmit the non-display signal of the second state, and the two electrode groups stay at the stand-by state not transmitting the data at this period. This is not limited in this invention.

As shown in FIG. 3B, during the transmission of the non-display signal, the 5 electrodes of the first electrode group G1 need not to transmit the signals with same amplitude in order to result in one state of the non-display signals. For example, the 5 electrodes of the first electrode group G1 can transmit the non-display signals of 2V, 1V, 3V, 2V and 2V, respectively, and the external object can determine the state of the non-display signal according to the magnitude of non-display signal received through the coupling capacitance. For example, the average received signal of 2V stands for the first state, 0V for second state, and −2V for third state. These voltage values also can be replaced by a range. For example, the average voltage of 1.5V~2V corresponds to the first state, the average voltage of −0.5V~0.5V corresponds to the second state, and the average voltage of −2V~−5V corresponds to the third state. Of course, the same manner can be applied to the non-display signal transmitted by the second electrode group G2. Besides, other than the average voltage, the non-display signal received by the receiving side of the external object also can be the sum of signals during a unit period of time.

In FIG. 3B, the first electrode group G1 transmits the non-display signal of the first state S1 (of course, FIG. 3B is just for the illustrative purpose, and the first electrode group G1 also can transmit the non-display signal of the third state S3), and the second electrode group G2 transmits the non-display signal of the second state S2. The first electrode group G1 is the data electrodes D11~D15, and the second electrode group G2 is the data electrodes D16~D20. The first state S1 and the third state S3 can represent the encoding of "1" and "0", respectively. For example, the first state S1 represents "1" and the third state S3 represents "0". The data information can be contained in the non-display signal through the encoding. After the receiving side receives and decodes the non-display signal, the information represented by the non-display signal (encoded signal) transmitted by the matrix substrate can be obtained.

In other words, the second electrode group G2 spatially separates the first electrode group G1 from other electrodes, so that the encoded signals won't interfere with each other and the recognition at the receiving side will not fail.

In order to simplify the illustration, some abbreviations are applied as following: G1 stands for the first electrode group G1, G2 for the second electrode group G2, G3 for the third electrode group G3, S1 for the first state S1, S2 for the second state S2, S3 for the third state S3, T1 for the first time, T2 for the second time and T3 for the third time. Besides, the encoded signal represents the first state S1 or third state S3 of the non-display signal, and the separating signal means the second state of the non-display signal. Herein, in this embodiment, the states of the electrode groups can be abbreviated as $[G1, G2]=[S1 \text{ or } S3, S2]_{T1}$, which means during the first time, the first electrode group G1 transmits the non-display signal of the first state S1 or third state S3 and the second electrode group G2 transmits the non-display signal of the second state S2. The following embodiments can be deduced by analogy.

Figures 4A, 4B:
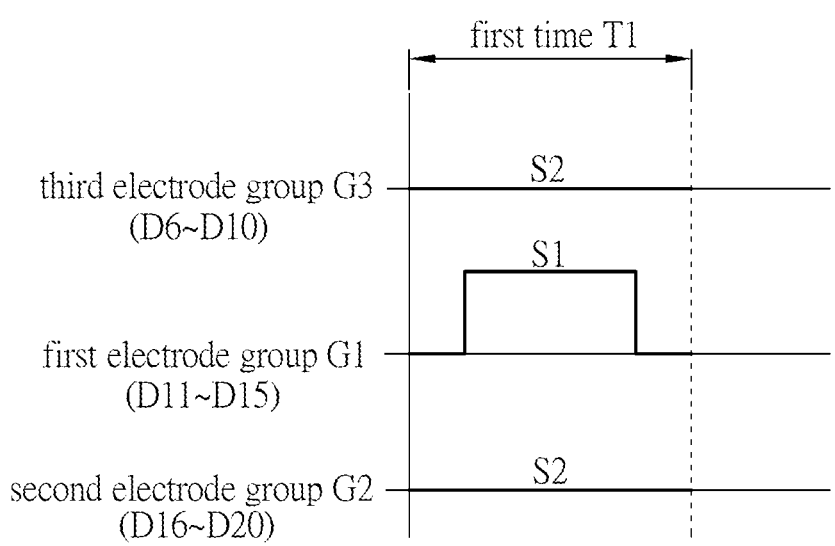
FIG. 4A is a table of the transmission state of the electrodes according to the non-display signal encoding method of an embodiment of the invention.
FIG. 4B is a schematic diagram showing the encoded non-display signal corresponding to FIG. 4A.

FIG. 4A is a table of the transmission state of the electrode according to the non-display signal encoding method of an embodiment of the invention, and FIG. 4B is a schematic diagram showing the encoded non-display signal corresponding to FIG. 4A. As shown in FIGS. 4A and 4B, in this embodiment, the first electrodes 111 or second electrodes 112 further include a third electrode group G3, and the first electrode group G1 spatially separates the second electrode group G2 from the third electrode group G3. Herein for example, the first electrode group G1 spatially separates the second electrode group G2 from the third electrode group G3, and the first electrode group G1, the second electrode group G2 and the third electrode group G3 all belong to the first electrodes 111. Besides, the first electrode group G1, the second electrode group G2 and the third electrode group G3 are directly adjacent to each other. Of course, the first electrode group G1, the second electrode group G2 and the third electrode group G3 can be separated from each other by at least one electrode.

As shown in FIG. 4A, in this embodiment, during the first time T1, the third electrode group G3 transmits the non-display signal of the second state S2, i.e. $[G3, G1, G2]=[S2, S1 \text{ or } S3, S2]_{T1}$.

As shown in FIG. 4B, the difference between this embodiment and the previous embodiment (FIGS. 3A and 3B) is that the second electrode group G2 and the third electrode group G3 are disposed spatially on the opposite sides of the first electrode group G1 (the second electrode group G2 and the third electrode group G3 may be directly adjacent to the first electrode G1 or not). For example, the first electrode group G1 is the data electrodes D11~D15, the second electrode group G2 is the data electrodes D16~D20, and the third electrode group G3 is the data electrodes D6~D10.

The transmission states of the electrodes of this embodiment can be abbreviated to $[G3, G1, G2]=[S2, S1 \text{ or } S3, S2]_{T1}$. Herein, the second and third electrode groups G2, G3 transmit the separating signal to separate the first electrode group G1 from other electrodes, and therefore the interference caused by other electrodes on the receiving side receiving the data signal transmitted by the first electrode group G1 can be reduced. Of course, the three electrode groups G1, G2, G3 can all stay at the stand-by state to transmit the second state S2.

Figures 5A, 5B:
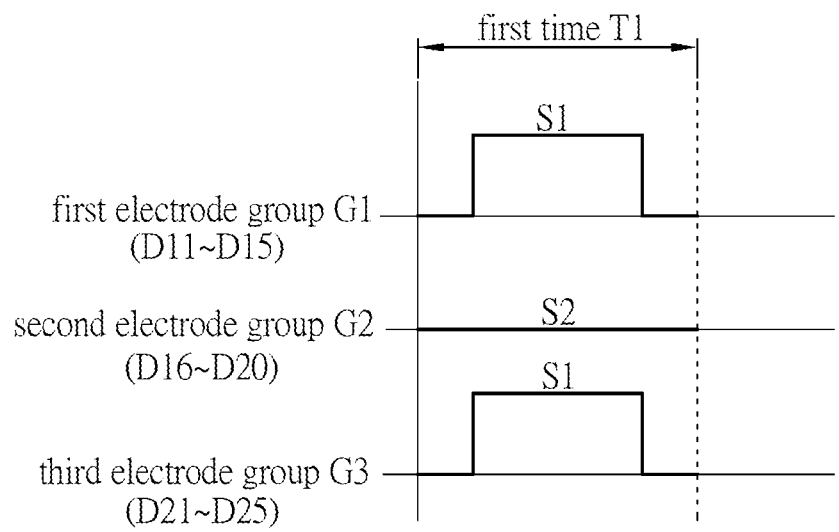
FIG. 5A is a table of the transmission state or the electrodes according to the non-display signal encoding method of an embodiment of the invention.
FIG. 5B is a schematic diagram showing the encoded non-display signal corresponding to FIG. 5A.

FIG. 5A is a table of the transmission state of the electrode according to the non-display signal encoding method of an embodiment of the invention, and FIG. 5B is a schematic diagram showing the encoded non-display signal corresponding to FIG. 5A.

As shown in FIG. 5A, in this embodiment, during the first time T1, the third electrode group G3 transmits the non-display signal of the first state S1, second state S2 or third state S3.

As shown in FIG. 5B, this embodiment is different from the previous embodiment (FIGS. 4A and 4B) by that the first electrode group G1, the second electrode group G2 and the third electrode group G3 are disposed differently in space. In this embodiment, the second electrode group G2 spatially separates the first electrode group G1 from the third electrode group G3 (D2~D25), and the second electrode group G2 transmits the non-display signal of the second state S2 (separating signal) to separate the signals of the first electrode group G1 from the signals of the third electrode group G3. Thereby, the interference between the data signals transmitted by the first and third electrode group G1 and G3 and received by the receiving side can be reduced. In other words, in this case, the transmission states of the electrodes can be abbreviated to $[G1, G2, G3]=[S1 \text{ or } S3, S2, S1 \text{ or } S3]_{T1}$.

Figures 6A, 6B:
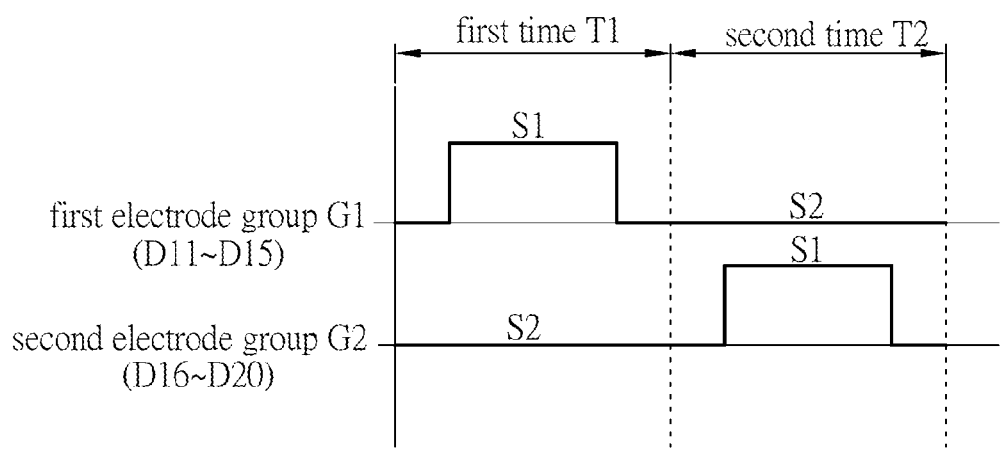
FIG. 6A is a table of the transmission state of the electrodes according to the bon-display signal encoding method of an embodiment of the invention.
FIG. 6B is a schematic diagram showing the encoded non-display signal corresponding to FIG. 6A.
Figure 6C:
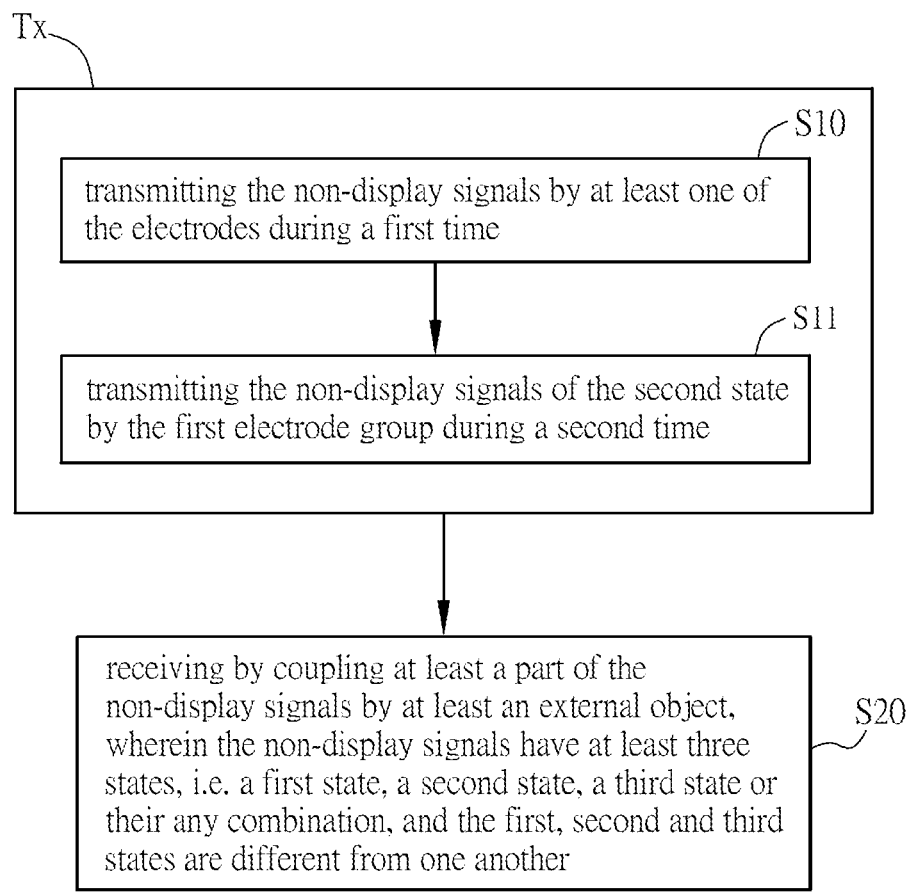
FIG. 6C is a schematic flowchart of a non-display signal encoding method of an embodiment of the invention.

FIG. 6A is a table of the transmission state of the electrode according to the non-display signal encoding method of an embodiment of the invention, FIG. 6B is a schematic diagram showing the encoded non-display signal corresponding to FIG. 6A, and FIG. 6C is a schematic flowchart of a non-display signal encoding method of an embodiment of the invention.

As shown in FIGS. 6A and 6C, the non-display signal encoding method further includes the step S11. In the step S11, during a second time T2, the first electrode group G1 transmits the non-display signal of the second state S2.

As shown in FIG. 6B, this embodiment is different from the above embodiment (FIGS. 3A and 3B) by that the first electrode group G1 transmits the non-display signal of the second state S2 (separating signal) during the second time T2 to separate the non-display signal transmitted during the first time T1 in time domain. Therefore, the separating signal not only can provide the synchronization for the encoded signals transmitted at the different times but also can provide starting or ending mark for a transmitted encoded signal. Besides, the interference between the non-display signals transmitted by the first electrode group G1 at different times also can be reduced.

To be noted, the second electrode group G2 can transmit the non-display signal (encoded signal) of the first state S1 or third state S3 during the second time T2, or can continue transmitting the non-display signal of the second state S2 (separating signal). That is, the transmission states of the electrodes of this embodiment can be abbreviated to [G1, G2]=[S1 or S3, S2]$_{T1}$, [S2, S1 or S2 or S3]$_{T2}$.

In this embodiment, the matrix substrate 1, as the transmission side transmitter (Tx), transmits the non-display signals in the steps S10 and S11, and the external object 3 continuously couples the non-display signals transmitted by the transmission side Tx. In other words, when the transmission side Tx executes the step S10, the external object 3 can couple, in real-time, the non-display signal transmitted by the transmission side Tx, and when the transmission side Tx executes the step S11, the external object 3 also couples in real-time the non-display signal transmitted by the transmission side Tx. However, this invention is not limited thereto.

Figures 7A, 7B:
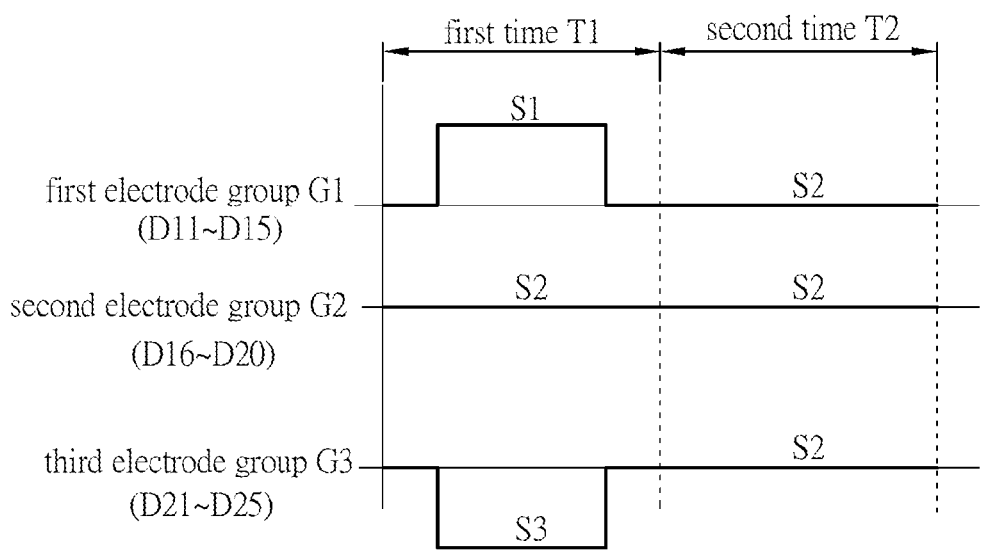
FIG. 7A is a table of the transmission state of the electrodes according to the non-display signal encoding method of an embodiment of the invention.
FIG. 7B is a schematic diagram showing the encoded non-display signal corresponding to FIG. 7A.

FIG. 7A is a table of the transmission state of the electrode according to the non-display signal encoding method of an embodiment of the invention, and FIG. 7B is a schematic diagram showing the encoded non-display signal corresponding to FIG. 7A.

As shown in FIG. 7A, in this embodiment, during the first time T1, the third electrode group G3 transmits the non-display signal of the first state S1, second state S2 or third state S3. During the second time T2, the third electrode group G3 transmits the non-display signal of the second state S2.

As shown in FIG. 7B, this embodiment is different from the above embodiment (FIGS. 5A and 5B) by that all the three electrode groups G1, G2, G3 of this embodiment can transmit the second state S2 during, the second time T2 to separate all the signals (including the encoded signal and the separating signal) transmitted during the first time T1. Herein for example, the first electrode group G1 transmits the non-display signal of the first state S1 during the first time T1 and the third electrode group G3 transmits the non-display signal of the third state S3.

To be noted, the second electrode group G2 can transmit the non-display signal of the first state S1 or third state S3 (encoded signal) during the second time T2 or continue transmitting the non-display signal of the second state S2 (separating signal). Herein for example, the transmission states of the electrodes of this embodiment can be abbreviated to [G1, G2, G3]=[S1 or S3, S2, S1 or S2 or S3]$_{T1}$, [S2, S1 or S2 or S3, S2]$_{T2}$.

Figures 8A, 8B:
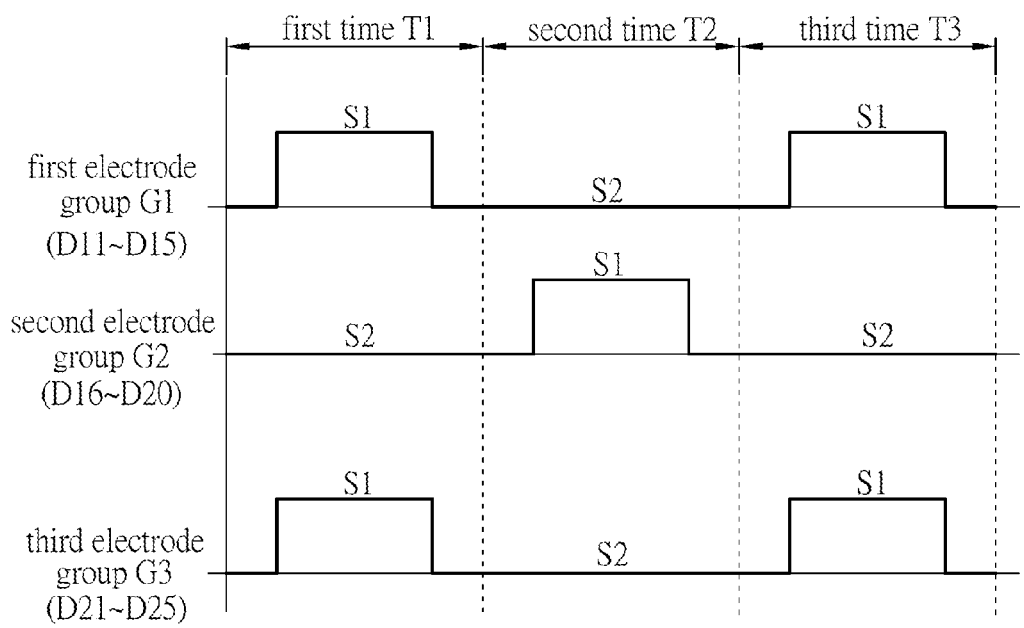
FIG. 8A is a table of the transmission state of the electrodes according to the non-display signal encoding method of an embodiment of the invention.
FIG. 8B is a schematic diagram showing the encoded non-display signal corresponding to FIG. 8A.
Figure 8C:
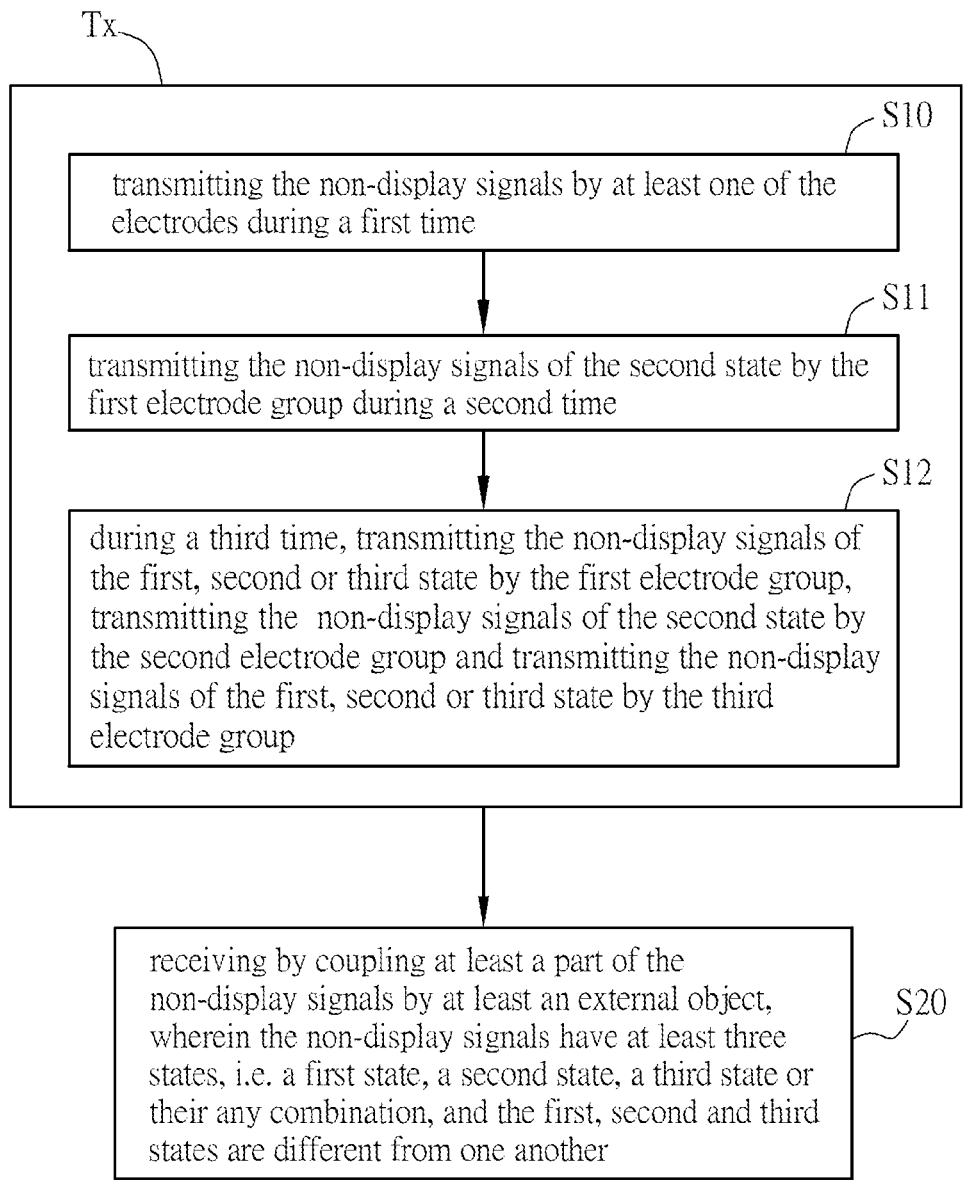
FIG. 8C is a schematic flowchart of a non-display signal encoding method of an embodiment of the invention.

FIG. 8A is a table of the transmission state of the electrode according to the non-display signal encoding method of an embodiment of the invention, FIG. 8B is a schematic diagram showing the encoded non-display signal corresponding to FIG. 8A, and FIG. 8C is a schematic flowchart of a non-display signal encoding method of an embodiment of the invention.

As shown in FIGS. 8A and 8C, in this embodiment, during the second time T2, the second electrode group G2 transmits the non-display signal of S1, S2 or S3, and the non-display signal encoding method further includes the step S12, in the step S12, during a third time T3, the first electrode group G1 and the third electrode group G3 both transmit S1, S2 or S3, and the second electrode group G2 transmits the non-display signal of S2.

Refer to FIG. 8B which shows the encoded signals of each electrode group during the first time T1, second time T2 and third time T3. By taking the first electrode group G1 as an example, it transmits S2 during the second time T2 to temporally separate the non-display signals (encoded signals) of S1 transmitted during the first time T1 and third time T3. The second electrode group G2 and the third electrode group G3 can be deduced by analogy.

Moreover, by using the separating signal S2, during any time, one of the three electrode groups can spatially separate the other two electrode groups (such as T1 or T3 case) or two of the three electrode groups separate the other electrode group (such as T2 case), By taking the second time T2 as an example, the non-display signal of S1 or S3 transmitted by the second electrode group G2 is separated by the non-display signals of S2 (separating signal) transmitted by the first and third electrode groups G1, G3.

In other words, the transmission states of the electrodes of this embodiment can be abbreviated to [G1, G2, G3]=[S1 or S3, S2, S1 or S2 or S3]$_{T1}$, [S2, S1 or S2 or S3, S2]$_{T2}$, [S1 or S2 or S3, S2, S1 or S2 or S3]$_{T3}$. When all the electrodes transmit the second state S2 during a time, they are staying at the stand-by state not transmitting the signals.

To be noted, this embodiment not only uses the spatial separation but also the temporal separation, so as to reduce the mutual interference between the non-display signals transmitted at different times and the mutual interference between the non-display signals transmitted by different electrodes simultaneously.

In this embodiment, the matrix substrate 1 as the transmission side Tx transmits the non-display signals in the steps S10, S11 and S12, and the external object 3 continuously couples the non-display signals transmitted by the transmission side Tx. In other words, when the transmission side Tx executes the step S10, the external object 3, in real-time, couples the non-display signal transmitted by the transmission side Tx, and when the transmission side Tx executes the step S11, the external object 3 also in real-time couples the non-display signal transmitted by the transmission side Tx. The rest can be deduced by analogy and this invention is not limited thereto.

Figure 9:
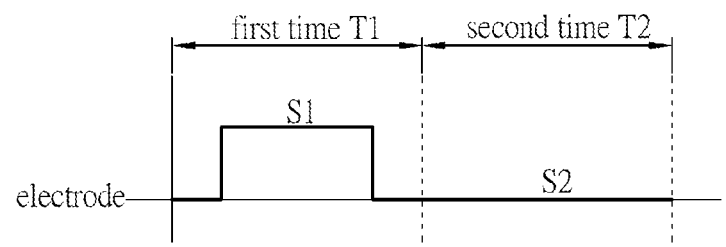
FIG. 9 is a schematic diagram of another non-display signal encoding.

Refer to FIG. 9, which is a schematic diagram of another non-display signal encoding. In this embodiment, the electrodes of the matrix substrate are not divided into groups (the electrodes are called the first electrodes herein). The first electrodes transmit the non-display signal of the second state S2 during the first time T1 and/or the second time T2. For example, the all first electrodes transmit the encoded signals during the first time T1 and transmit the separating signals during the second time T2. The above first time T1 and second time T2 can be consecutive or not, and the first time T1 or second time T2 can be a period of time or a time point.

In other words, this embodiment just uses the temporal separation that the separating signal S2 is transmitted during the second time T2 to separate S1 or S3 transmitted during the first time T1 from the non-display signals transmitted during other times.

To be noted, although the first time T1 is illustrated with time located before the second time T2 in this case, their sequence is not limited in this invention. Therefore, in practice, the second time T2 also can be prior to the first time T1, and that is, a separating signal can be transmitted earlier (which also represents the starting of the transmission of the encoded signals) or later (which also represents the ending of the transmission of the encoded signals). Besides, the non-display signal of S2 also can be transmitted during the first time T1. However, this invention is not limited thereto.

Figure 10:
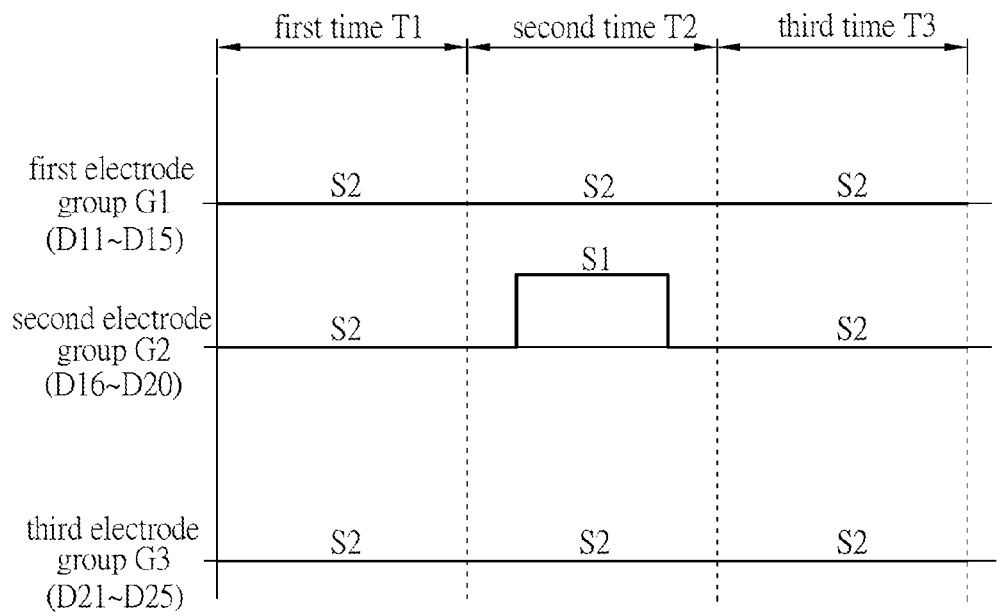
FIG. 10 is a schematic diagram of another non-display signal encoding.

Refer to FIG. 10, which is a schematic diagram of another non-display signal encoding. In this embodiment, the electrodes are divided into the first electrode group G1, the second electrode group G2 and the third electrode group G3, and the times are divided into the first time T1, the second time T2 and the third time T3. Herein, only the second electrode group G2 transmits the encoded signals S1 or S3 during the second time T2, and the separating signals of S2 are transmitted in the other combinations of times and electrode groups.

Herein, time and space can be regarded as two axes, and the encoded signal is bounded within the separating signals. Therefore, the recognition level at the receiving side can be further enhanced.

Refer to FIGS. 2A and 11, and FIG. 11 is a table of the transmission state of the electrodes of the non-display signal encoding method of an embodiment of the invention. The main difference from the above embodiments is that this embodiment uses two binary systems to constitute the encoding manner of a quaternary system. Herein, the non-display signals have a first state, a second state, a third state and a fourth state, and the above states are recognized on the basis of the sum of the amplitude of the signals received by the receiving side.

As shown in FIG. 11, the first electrodes 111 (such as data electrodes) can transmit the non-display signals of two kinds of voltages (such as 0V and 5V), and the second electrodes (such as scan electrodes) can transmit the non-display signals of two kinds of voltages (such as −12.5V and −10V). Then, the non-display signal received by the receiving side at a time whit is the voltage sum of the non-display signals transmitted by the first electrodes 111 and the second electrodes 112, and the receiving side can determine the state of the received non-display signals accordingly. For example, the voltage levels of the four states can be specified as S1 (−12.5V), S2 (−10V), S3 (−7.5V) and S4 (−5V). That is, when the first electrodes 111 transmit the non-display signal of 5V and the second electrodes 112 transmit the non-display signal of −10V, the receiving side can determine that the received non-display signal is the fourth state S4. Herein, the fourth state can be used for the separation or acting as a starting or ending mark for a data signal.

Since the technical features of this matrix substrate can be comprehended by referring to the embodiments of the non-display signal encoding method, the related descriptions are omitted here for conciseness.

In summary, according to the non-display signal encoding method and the matrix substrate of the invention, the encoding of the non-display signals is implemented in the manner of at least ternary system. The ternary system represents the non-display signals have three different states. One of the states can be used to act as the separating signal. By the spatial or temporal separation, the mutual interference between the non-display signals transmitted by different electrodes at the same time can be reduced, or the mutual interference between the non-display signals transmitted by the same electrode at different times can be reduced. Therefore, the reliability and recognition of the data transmission can be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A non-display signal encoding method cooperating with a matrix substrate including a plurality of electrodes crossing each other and transmitting a plurality of display signals and a plurality of non-display signals, the non-display signal encoding method comprising steps of:

transmitting the non-display signals by at least one of the electrodes during a first time; and receiving by coupling at least a part of the non-display signals by at least an external object, wherein the non-display signals have a first state, a second state, and a third state or their any combination, and the first state, second state and third state are different from one another, wherein electrodes of the matrix substrate include a plurality of first electrodes arranged along a first direction and a plurality of second electrodes arranged along a second direction, and at least one of the first electrodes or second electrodes transmits the non-display signals, wherein the first electrodes or second electrodes include a first electrode group and a second electrode group, and each of the electrode groups includes at least an electrode, wherein during the first time, the first electrode group transmits the non-display signals of the first state or third state, and the second electrode group transmits the non-display signals of the second state, wherein during a time other than the first time, the first electrode group transmits the non-display signals of state different from the state that the first electrode group transmits during the first time, wherein information carried by the non-display signals is encoded by the first state and the third state, and the second state is for separating the first state and third state.

2. The non-display signal encoding method as recited in claim 1, wherein the matrix substrate is an active matrix substrate or a passive matrix substrate.

3. The non-display signal encoding method as recited in claim 1, wherein the first, second and third states have different amplitudes, or levels, or phases, or frequencies, or their any combination.

4. The non-display signal encoding method as recited in claim 1, wherein the first electrodes or second electrodes further include a third electrode group, the first electrode group spatially separates the second electrode group from the third electrode group, and during the first time, the third electrode group transmits the non-display signals of the second state.

5. The non-display signal encoding method as recited in claim 1, wherein the first electrodes or second electrodes further include a third electrode group, the second electrode group spatially separates the first electrode group from the third electrode group, and during the first time, the third electrode group transmits the non-display signals of the first state, second state or third state.

6. The non-display signal encoding method as recited in claim 1, wherein the electrode transmitting the non-display signals transmits the non-display signals of the second state during the first time or a second time.

7. The non-display signal encoding method as recited in claim 1, further comprising a step of:

transmitting the non-display signals of the second state by the first electrode group during a second time.

8. The non-display signal encoding method as recited in claim 7, wherein the first electrodes or second electrodes further include a third electrode group, the second electrode group spatially separates the first electrode group from the third electrode group, and the third electrode group transmits the non-display signals of the first state, second state or third state during the first time and transmits the non-display signals of the second state during the second time.

9. The non-display signal encoding method as recited in claim 8, wherein the second electrode group transmits the non-display signals of the first state, second state or third state during the second time and the non-display signal encoding method further comprises a step of:

during a third time, transmitting the non-display signals of the first state, second state or third state by the first electrode group, transmitting the non-display signals of the second state by the second electrode group, and transmitting the non-display signals of the first state, second state or third state by the third electrode group.

10. The non-display signal encoding method as recited in claim 1, wherein the matrix substrate corresponds to a display module and the encoding method further comprises a step of:

displaying at least a registration pattern by the display module, wherein the registration pattern shows the information of contents carried by the non-display signals or the information required for receiving the non-display signals.

11. A matrix substrate, comprising:

a plurality of electrodes crossing each other and transmitting a plurality of display signals and a plurality of non-display signals, wherein at least one of the electrodes transmits the non-display signals during a first time, at least an external object receives by coupling at least a part of the non-display signals, the non-display signals have a first state, a second state, and a third state or their any combination, and the first state, second state and third state are different from one another, wherein electrodes of the matrix substrate include a plurality of first electrodes arranged along a first direction and a plurality of second electrodes arranged along a second direction, and at least one of the first electrodes or second electrodes transmits the non-display signals, wherein the first electrodes or second electrodes include a first electrode group and a second electrode group, and each of the electrode groups includes at least an electrode, wherein during the first time, the first electrode group transmits the non-display signals of the first state or third state, and the second electrode group transmits the non-display signals of the second state, wherein during a time other than the first time, the first electrode group transmits the non-display signals of state different from the state that the first electrode group transmits during the first time, wherein information carried by the non-display signals is encoded by the first state and the third state, and the second state is for separating the first state and third state.

12. The matrix substrate as recited in claim 11, wherein the first, second and third states have different amplitudes, or levels, or phases, or frequencies, or their any combination.

13. The matrix substrate as recited in claim 11, wherein the first electrodes or second electrodes further include a third electrode group, the first electrode group spatially separates the second electrode group from the third electrode group, and during the first time, the third electrode group transmits the non-display signals of the second state.

14. The matrix substrate as recited in claim 11, wherein the first electrodes or second electrodes further include a third electrode group, the second electrode group spatially separates the first electrode group from the third electrode group, and during the first time, the third electrode group transmits the non-display signals of the first state, second state or third state.

15. The matrix substrate as recited in claim 11, wherein the electrode transmitting the non-display signals transmits the non-display signals of the second state during the first time or a second time.

16. The matrix substrate as recited in claim 11, wherein the first electrode group transmits the non-display signals of the second state during a second time.

17. The matrix substrate as recited in claim 16, wherein the first electrodes or second electrodes further include a third electrode group, the second electrode group spatially separates the first electrode group from the third electrode group, and the third electrode group transmits the non-display signals of the first state, second state or third state during the first time and transmits the non-display signals of the second state during the second time.

18. The matrix substrate as recited in claim 17, wherein the second electrode group transmits the non-display signals of the first state, second state or third state during the second time, and during a third time, the first electrode group transmits the non-display signals of the first state, second state or third state, the second electrode group transmits the non-display signals of the second state, and the third electrode group transmits the non-display signals of the first state, second state or third state.

* * * * *